United States Patent Office 3,049,528
Patented Aug. 14, 1962

3,049,528
POLYMERIZATION OF BUTADIENE-1,3 HYDROCARBONS
Hugh E. Diem, Wadsworth, Ohio, assignor to The B. F. Goodrich Company, New York, N.Y., a corporation of New York
No Drawing. Filed Dec. 30, 1958, Ser. No. 783,696
6 Claims. (Cl. 260—94.2)

The present invention relates to the polymerization of 1-olefinically unsaturated monomers and particularly to the polymerization of butadiene-1,3 hydrocarbons. Most particularly, the invention relates to the production of high cis-1,4 polymers from isoprene and high 1,4 polymers of butadiene.

In recent years several stereospecific catalysts have been shown to produce polymers from butadiene and isoprene wherein the structure is predominantly or almost exclusively 1,4, such as high cis-1,4, high trans-1,4 or mixed cis-trans, all-1,4 structures. For example, lithium metal has been shown to produce polyisoprenes having a structure sufficiently high in cis-1,4 content as to have properties approaching those of natural (Hevea) rubber. With butadiene, lithium produces a polymer containing about equal proportions of cis- and trans-1,4 structure with up to 10 or 12% 1,2 structure. In contrast, sodium catalysts produce a polybutadiene in which there is 50–60% 1, 2 structure, 25 to 30% trans-1,4 and 15–20% cis-1,4 structure.

The lithium metal catalysts are somewhat difficult to work with. In the first place, the lithium metal catalyst is easily poisoned by very small amounts of impurities in solvents and monomers leading to long induction periods in starting up of the reaction. Sometimes glass beads assist in overcoming catalyst poisoning, presumably by mechanically abrading the surface of the catalyst particles. Increasing the catalyst proportion to overcome the retarding effects of impurities is dangerous and undesirable because once started the reaction may be uncontrollable and the molecular weight of the product will be low due to overheating and too high a catalyst level. Further, it is most difficult to prepare a finely-divided lithium metal catalyst having a fully active surface. Microscopic impurities and traces of oxygen and moisture are sufficient to render even finely dispersed (e.g., colloidally dispersed) lithium metal particles quite inactive as polymerization catalysts.

Alkyl lithium compounds are much more vigorous catalysts than metallic lithium in that polymerization commences much more readily. But here again, impurities raise havoc and, when the catalyst level is raised to compensate, the molecular weight will be low. Further, the alkyl lithium compounds are expensive.

It would be desirable, therefore, to provide a catalyst system based on lithium metal which would be more active, more controllable, and produce superior polymers high in molecular weight. Other objects and advantages will become apparent.

In accordance with the present invention, the above and other objects are obtained in a process wherein a monomer of the class defined below is polymerized in a medium containing a finely-divided metallic catalyst consisting of an alloy of lithium and potassium metals in a weight ratio, respectively, of between about 5000:1 and about 20:1. The effect of the potassium metal is primarily to activate the polymerization reaction since the reaction starts readily and proceeds vigorously to substantial completion in a minimum of time. The reaction rate and molecular weight of the product can be controlled to a considerable extent by varying the total catalyst proportion and the potassium level therein. Sodium does not activate in a similar fashion and has such a powerful tendency toward 3,4 and 1,2 structures as to lead to highly heterogeneous structures in all cases.

The lithium/potassium alloy catalysts of this invention are highly stereospecific in that the monomer groups appear to be united in the polymer in one, or predominantly one, stereoisomeric form. For example, with butadiene the butadiene units will be united substantially all (i.e. 90% or better) 1,4 with equal or better proportions of the 1,4 units as the more desirable cis-1,4 structure. If desired, however, the polymerization can be caused to proceed in a contrary direction producing an essentially all-1,2 polymer by the addition of a very minor proportion of an ether. Likewise, with isoprene, the alloy catalyst will produce polyisoprenes of essentially all-1,4 structure in which the cis-1,4 structure is in great preponderance and the trans-1,4, 3,4 and 1,2 structures are very small. Polyisoprenes of 90% or better cis-1,4 structure have been produced. Addition of small proportions of an ether to an isoprene polymerization being carried out with the alloy catalyst will produce essentially all 3,4 polyisoprenes. The stereospecific effects on the polymer can also be varied or modified as indicated below.

Levels of potassium in the upper portions of the range given above cause an increase in the proportion of 3-4 structure, in the case of isoprene polymers, and in the 1,2 content in the case of the polybutadienes. It has been found that several things may be done to suppress this influence of potassium. This tendency to greater heterogeneity of structure can be ameliorated by reducing the total catalyst level and by carrying out the polymerization in an aliphatic hydrocarbon solvent or diluent. Still better, the polymerization can be carried out in any hydrocarbon medium in the presence of an inhibitor of potassium polymerization such as methyl aniline. By any one, or a combination of two or more of these, butadiene-1,3 hydrocarbon polymers may be produced having the desired structure very high in 1,4 content.

The potassium-activated catalyst is a finely-divided form of an alloy of potassium and lithium in which the potassium content ranges from at least 0.02% by weight (Li:K weight ratio of 5000:1) to 5% (weight ratio 20:1) or even higher. However, lithium and potassium are not compatible in infinite proportions since true alloys are formed only at levels below about 1.5%. A macro-dispersion of solid potassium in lithium has poorer activating value and, furthermore, will exert too strong an effect favoring 3,4 and 1,2 structures in the polymer.

It is strongly preferred to operate with alloys containing from about 0.15 to 1.5% (Li/K ratio of from 666:1 to 66:1) by weight of potassium. At these levels of potassium in aliphatic hydrocarbon solvents, polyisoprenes containing 90% or better cis-1,4 content, low gel, and high molecular weight are obtained. Polymers such as these have been demonstrated as having great value in large size truck, bus and off-the-road tires and in airplane tires where hysteresis heat build-up is a major problem. These same low-potassium catalysts produce high 1,4 polybutadienes wherein the 1,2 content is low and the cis-1,4 structure predominates.

The total proportion of the alloy ctatlyst required is usually quite low. When operating with great care utilizing very pure monomers and solvents, the potassium content of the catalyst usually is manifest principally by way of reduced induction periods. Under usual circumstances wherein commercial and/or technical grade materials are utilized, the activating effects of the potassium is more readily detectable and it is generally possible to obtain prompt and rapid polymerization with quite small proportions of catalyst. In general, from as little as about 0.03 part weight to as much as 100 parts/wt. of lithium metal per 100 parts/wt. of monomer can be utilized. It is usually preferred to utilize from about 0.05 to about 0.5 part/wt. of metallic lithium per 100 parts/wt. of monomer. These proportions are expressed as pure lithium metal since the potassium content is so small as to be neglected. The catalyst to be fully effective, should be finely-divided, that is in the form of particles smaller than 20 microns in diameter, more preferably smaller than 10 microns. Especially suitable catalysts have particles averaging 1 to 2 microns in diameter, or less.

Such a finely-divided alloy catalyst can be made most conveniently by melting the lithium and potassium metals together under an inert atmosphere and then pouring the liquid melt into, or mixing it with, a hot, melted petrolatum jelly under an inert atmosphere such as helium, argon, hydrocarbon vapors, etc. with vigorous shearing type agitation to form a dispersion which on cooling solidifies in a form very easy to handle. Nitrogen can not be utilized as an inert atmosphere due to the tendency of lithium to react therewith. Dispersions made in this manner are made easily with particles ranging from about 0.5 to 5 microns in diameter. After cooling, the resulting solidified dispersion dissolves readily in hydrocarbons forming a very good dispersion of metal in its most active form.

Where utilized, the inhibitor of potassium polymerization should be equivalent on a molar basis to at least one-half of the amount of potassium in the catalyst. Better yet, molar equivalent quantities should be utilized. Larger quantities can be employed, but little additional benefit is realized.

As indicated above, the polymerization can be carried out in an inert solvent or diluent, although mass polymerization (no solvent) can also be utilized. Suitable media in which to suspend the catalyst and dissolve the monomer include the aliphatic, aromatic and cycloaliphatic hydrocarbons, although the saturated aliphatic hydrocarbons of 4 to 10 carbon atoms are much preferred. Thus, there may be utilized propane, butane, pentane, hexane, octane, decane and other aliphatics; benzene, toluene and xylene and other aromatics; and cyclohexane cycloheptane and other cycloaliphatics. The monomer: solvent weight ratio can vary from about 1:50 to about 3:1, although ratios or from about 1:20 to 1:4 are preferred. The solvent medium should be dry and low in alcohols, oxygen, and peroxide as well as other active-hydrogen containing substances. In particular, both solvents and monomers should be low in acetylenic compounds.

The process of this invention is carried out by combining the solvent, monomers, and catalyst, in any order, and maintaining the resulting mixture under an inert atmosphere at a temperature in the range of about 0° to about 75° C., more preferably 20 to 55° C., until the reaction has proceeded to the desired extent. Since increasing conversion does not usually result in increased gel, essentially complete conversion of monomer to polymer is preferred. Gentle to moderate agitation is beneficial during the reaction. The reaction mixture should be protected by maintaining an inert atmosphere such as nitrogen, argon, helium or hydrocarbon vapors thereover at least until after the catalyst has been inactivated or quenched. The latter operation is effected by mixing the reaction mixture with an alcohol, an acid, water, amine, sulfide, or other active hydrogen containing substance. Such a step is much facilitated when the product is a polymer soluble in the reaction medium.

In some cases it may not be desired to produce polymers high in 1,4 structure. It may be desired, for example, to produce a polybutadiene high (i.e., at least 50%) in 1,2 structure or a polyisoprene high (i.e., at least 50%) in 3,4 structure. To do this, one need only to add a small quantity of an ether to the reaction mixture. Simple and complex ethers may be utilized for this purpose including diethyl ether, dipropyl ether, di-n-butyl ether, dioxane, tetrahydrofurane, furane, anisole, butadiene oxide, styrene oxide, condensates of ethylene oxide such as the high molecular weight phenol/ethylene oxide condensates utilized as non-ionic surfactants, and many others. The simple aliphatic ethers and tetrahydrofurane are fully effective, are inexpensive and are readily available in pure form. Only from about 1 to about 20 ml. of an ether per liter of reaction mixture will usually be sufficient.

The process and catalyst of this invention can be utilized to polymerize a great variety of monomers containing the $CH_2=C<$ type structure including methyl methacrylate, styrene and its substituted derivatives including the alpha-alkyl and alpha-alkoxy derivatives and the alpha-halo and nuclearly-halogenated and nuclearly alkylated derivatives such as alpha-methyl styrene, meta-methyl styrene, p-methoxy styrene, p-chloro styrene, and others. Butadiene-1,3 hydrocarbons are another class of $CH_2=C<$ containing monomers which are very readily polymerized by these catalysts including butadiene, isoprene, piperylene, 2-phenyl butadiene-1,3, 2,3 dimethyl butadiene-1,3 and many others. In general, monomers having "Q" values less than about 0.3 and "e" values below about 0 (wherein the "Q" and "e" values are as defined by Price, J. of Polymer Science, vol. 3 (1948), pp. 772–775). More specifically, the monomers recited in the lower right hand quadrant of the "monomer map" of Price, supra, page 774, have been found most easily polymerizable by lithium and lithium/potassium alloy catalysts.

Preferred monomers are the butadiene-1,3 hydrocarbons containing up to 5 carbon atoms, namely, butadiene-1,3 itself, isoprene and piperylene. These monomers are not only readily polymerized by these catalysts, but the polymerization is stereospecifically directed in any way it may be desired. As indicated above, all cis-1,4 polymers, all trans-1,4 polymers, all 3,4 polymers and all 1,2 polymers are obtained, as desired, with the alloy catalysts of this invention. Isoprene is most preferred. It is to be understood that one or more of any of the above-described and other monomers may be combined. When utilized in conjunction with butadiene-1,3 hydrocarbons, monoolefinic monomers should contain the group $CH_2=C<$ and be utilized in minor proportions (i.e. less than 50%/wt. of total monomer mixture). Styrene and its derivatives, methyl methacrylate, and methacrylonitrile are especially desirable comonomeric materials.

The process will now be described more in detail in several specific examples intended as being illustrative only.

*Example 1*

In this example, isoprene is polymerized with a Li/K mixture in the presence of methyl aniline in a benzene diluent medium which had previously been dried by being distilled away from finely-divided sodium metal under a nitrogen atmosphere. The isoprene is a commercial grade material specially purified by successive treatments first with colloidally-dispersed sodium metal and then with "4A" molecular sieves. The catalyst is a finely-divided (particle size ca. 0.5 micron) dispersion in an equal mixture of petrolatum and white mineral oil of a mixture of about 96%/wt. of lithium and about 4%/wt. of potassium. This catalyst is prepared by melting the lithium and potassium metals together and then passing the molten melt into the melted petrolatum/oil mixture while both are at a temperature above the solidification point of the mixed metals. Violent shear-type agitation (such as is supplied in a homogenizer) is applied to disperse the molten metal while cooling below the solidification point occurs. These operations are carried out under a helium atmosphere because metallic lithium will react with nitrogen. After solidification, the solid grease-like dispersion may be stored for long periods and handled briefly in air without substantial damage to its catalytic activity.

The materials are added in the order listed below to a dried reaction vessel while maintaining a continuous flow of dry nitrogen therethrough.

| Experiment No. | A | B | C | D | E | F |
|---|---|---|---|---|---|---|
| Benzene, ml | 150 | 150 | 150 | 150 | 150 | 150 |
| Isoprene, ml | 67.6 | 67.2 | 69.4 | 66.6 | 66.4 | 66.9 |
| Lithium/potassium dispersion, ml | 3.1 | 3.1 | 2.0 | 2.0 | 1.0 | 1.0 |
| G. Li/100g. of isoprene | .34 | .34 | .247 | .247 | .123 | .123 |
| Methyl aniline,[1] drops | None | 3 | None | 2 | None | 1 |
| Temp. °C | 55 | 55 | 55 | 55 | 55 | 55 |
| Time | ([2]) | [3]10 | [4]65 | [4]65 | [3]10 | [3]10 |
| Percent conv | ([2]) | 42.6 | 98.5 | 100 | 95 | 66.5 |
| D.S.V.[5] | ([2]) | 2.9 | 3.6 | 6.47 | 4.43 | 9.25 |
| Infrared ratio (ratio of optical densities of 3, 4 and 1, 4 absorption | -------- | 8.05 | 1.36 | 0.604 | 1.15 | 0.53 |

[1] Approximately equimolar with the potassium content.
[2] Exploded. [3] Days. [4] Hours.
[5] Dilute solution viscosity of a solution of 0.2 gram polymer in 100 ml. benzene.

About 10 grams of each of polymers C to F are added to separate portions of n-butane and soluble and insoluble fractions isolated. The D.S.V. and infrared ratio (the ratio of the optical densities of the 3,4 and 1.4 structures) are then determined on the soluble and insoluble fractions.

| | C | D | E | F |
|---|---|---|---|---|
| Percent butane soluble | 20.8 | 0.68 | 13.3 | 0.22 |
| Do | 77.1 | 96.6 | 84.9 | 99.1 |
| D.S.V. soluble fraction | 1.57 | 3.05 | 1.68 | 1.13 |
| D.S.V. insoluble fraction | 4.21 | 8.08 | 4.91 | 8.94 |
| Infrared ratio (soluble) | 2.21 | 0.74 | 2.67 | 0.72 |
| Infrared ratio (insoluble) | 1.10 | 0.60 | 0.94 | 0.49 |

The above data show several very interesting things. First of all, the presence of methyl aniline seemed to favor much higher molecular weights and very materially lower infrared ratios. Experiments C and E produced polyisoprenes having a very appreciable 3,4 content (ca. 10–15%) whereas Experiments D and F (which utilize methyl aniline) produced polyisoprenes containing about 5% 3,4 structure, several percent of 1,2 structure and over 90% cis-1,4. In contrast, polyisoprene made in aqueous emulsion analyzes about 70% trans-1,4; about 19% cis-1,4; about 6% 1,2; and about 5% 3,4.

The data on the fractionated samples is especially interesting. Experiments D and F with methyl aniline produced a polyisoprene virtually completely insoluble in n-butane, whereas, without methyl aniline, Experiments C and E produced 13–21%/wt. of butane-soluble material. The butane-soluble fractions are materially lower in molecular weight and materially higher in infrared ratio. This is interpreted as meaning that the polymer attributable to the potassium content of the catalyst is mostly low polymer showing that the methyl aniline "shortstops" the growing potassium-activated chains very early in their existence before they can grow. When one compares the very low infrared ratios for the whole polymer with those of the corresponding butane-insoluble fractions it is readily apparent how effective methyl aniline is in inhibiting the adverse structural effects of the potassium.

*Example 2*

The results obtained in Example 1 can be compared to those of this example wherein the potassium content of the catalyst is replaced with 0.35%/wt. of sodium. Hexane solvent is utilized in some of the charges. For the purposes of comparison, duplicate charges of Li/K alloy catalyst are carried out. The data are as follows:

| Experiment No. | A | B | C | D | E | F | G | H | I | J | K | L |
|---|---|---|---|---|---|---|---|---|---|---|---|---|
| Benzene, ml | | | | | | | 200 | 200 | 200 | 200 | 200 | 200 |
| Hexane, ml | 200 | 200 | 200 | 200 | 200 | 200 | | | | | | |
| Isoprene, ml | 50 | 50 | 50 | 50 | 50 | 50 | 50 | 50 | 50 | 50 | 50 | 50 |
| 96 Li/4K dispersion, ml | 0.49 | 0.49 | | | | | 0.49 | 0.49 | | | | |
| 99.65 Li/0.35 Na disp., ml | | | 1.95 | 1.95 | 0.97 | 0.97 | | | 1.95 | 1.95 | 0.97 | 0.97 |
| G. Li/100 g. Isoprene | .15 | .15 | .5 | .5 | .25 | .25 | .15 | .15 | .50 | 0.50 | 0.25 | 0.25 |
| Temp., °C | 50 | 50 | 50 | 50 | 50 | 50 | 50 | 50 | 50 | 50 | 50 | 50 |
| Time, hrs | 16 | 16 | 88 | 120 | | 120 | 72 | 72 | 101 | 101 | 101 | 101 |
| Percent conversion | 100 | 100 | 100 | ([1]) | ([1]) | ([1]) | 91 | 82 | | | | |
| D.S.V. | 2.25 | 2.92 | 6.27 | ([1]) | ([1]) | | .467 | .420 | | | | |
| I.R. ratio | 0.77 | 0.77 | 0.49 | ([1]) | ([1]) | | ([2]) | ([2]) | ([2]) | ([2]) | ([2]) | ([2]) |

[1] No reaction. [2] Mostly 3,4.

These data show very little, if any activating value for sodium (note longer reaction times) and, moreover, almost complete loss of the cis-1,4 structure. Even the very small amount of sodium seems to be able to dominate the weaker lithium metal in stereo-specific activity.

*Example 3*

In this example, an alloy catalyst dispersion similar to that of Example 1, but containing only about 1%/wt. of potassium, is utilized in the polymerization of isoprene in a hexane solvent. A re-run of the 4% K catalyst is included for comparison. The hexane is charged first to a dry reaction vessel under nitrogen flow and the vessel then sealed. Isoprene is then injected and the vessel heated slightly and the accumulated gases and vapors in the vessel vented off in order to get rid of dissolved oxygen. Finally, the lithium/potassium alloy dispersion is added and the temperature maintained at 50° C. The data are as follows:

| Experiment No. | A | B | C | D | E | F | G | H | I | J | K | L |
|---|---|---|---|---|---|---|---|---|---|---|---|---|
| Hexane, ml | 200 | 200 | 200 | 200 | 200 | 200 | 200 | 200 | 200 | 200 | 200 | 200 |
| Isoprene, ml | 50 | 50 | 50 | 50 | 50 | 50 | 50 | 50 | 50 | 50 | 50 | 50 |
| 96 Li/4K disp., ml | 0.49 | 0.49 | 0.33 | 0.35 | 0.25 | 0.25 | | | | | | |
| 99 Li/1K disp | | | | | | | 1.5 | 1.5 | 1.13 | 1.13 | .75 | .75 |
| G. Li/100 g. isoprene | .15 | .15 | .10 | .10 | 0.075 | 0.075 | .4 | .4 | .3 | .3 | .2 | .2 |
| Time, hrs | 18 | 18 | 18 | 66 | 138 | | 16.5 | 645 | | 16.5 | 16.5 | 40.5 |
| Percent conversion | 95 | 93 | 99 | 89 | 98 | | 96 | 100 | | | 93 | 92 |
| D.S.V. | 3.86 | 3.19 | 4.12 | 2.86 | 4.07 | | 5.03 | 13.5 | | 6.69 | 10.4 | 12.1 |
| I.R. ratio | .76 | .81 | .74 | .76 | .60 | | .75 | .57 | | .72 | .52 | .59 |

As indicated above, 1% potassium appears to activate just about as much, if not more, than 4%. Further, the D.S.V. values are higher and infrared ratios are consistently lower at the lower potassium level.

*Example 4*

In this example, isoprene is polymerized in pentane utilizing the 96/4 lithium-potassium alloy catalyst of Example 1. The data are are follows:

| Experiment No. | A | B | C | D |
|---|---|---|---|---|
| Pentane, ml. | 250 | 250 | 250 | 250 |
| 96/4 Li/K dispersion, ml. | 2 | 1.5 | 1.0 | 0.5 |
| G. Li/100 g. isoprene | 0.49 | .37 | .25 | .12 |
| Temp., °C. | 25 | | | |
| Time, hrs. | 67 | 2.46 | | |
| Percent conversion | 100 | 6.98 | 89 | 0 |
| D.S.V. | 2.24 | | 2.81 | |
| I.R. ratio | 4.59 | | 7.48 | |

The above data shows the at the lower temperature of 25° C. requires higher catalyst levels which reacts unfavorably on both the molecular weight and I.R. ratio values.

*Example 5*

In this example, isoprene is mass polymerized (i.e., no solvent) both with, and without methyl aniline, utilizing the catalyst dispersion described in Example 1. In this case, methyl aniline (1 ml.) is dissolved in 50 ml. of pentane to form a dilute solution ("Sol. A.," below) facilitating more accurate measurement. The data are as follows:

| Experiment No. | A | B | C | D | E | F | G | H |
|---|---|---|---|---|---|---|---|---|
| Isoprene, ml. | 100 | 100 | 100 | 100 | 100 | 100 | 100 | 100 |
| "Sol. A.," ml. | | 1.8 | | | | 0.9 | | 0.6 |
| 96 Li/4K disp., ml. | 3.1 | 3.1 | 2.0 | 2.0 | 1.5 | 1.5 | 1.0 | 1.0 |
| G. Li/100 g. isoprene | 0.34 | .34 | .245 | .245 | .185 | .185 | .123 | .123 |
| Temp., °C. | 50 | 50 | 50 | 50 | 50 | 50 | 50 | 50 |
| Time, hrs. | 21 | (1) | 21 | 102 | 21 | 23 | 21 | (1) |
| Percent conversion | 95 | 9.3 | 98 | 15.7 | 98 | | | 10.4 |
| D.S.V. | 1.29 | 4.49 | 1.63 | 6.47 | 1.77 | | 3.1 | 5.11 |
| I.R. ratio | 1.94 | 0.76 | 1.59 | 0.73 | 1.45 | | 1.21 | 0.74 |

[1] Blew up.

Here again the strong 3,4-repressing effect of methyl aniline is plainly evident.

*Example 6*

In this example, butadiene-1,3 is polymerized in hexane, on the one hand, and in benzene, on the other, utilizing the 96 Li/4K alloy dispersion catalyst described in Example 1. In several cases, tetrahydrofurane is included to modify the polymer structure. The data are as follows:

parison of similar reactions carried out with 1 and 4% potassium catalysts. The data are given below:

| Experiment No. | A | B | C | D | E | F |
|---|---|---|---|---|---|---|
| Hexane, ml. | 180 | 180 | 180 | 180 | 180 | 180 |
| Butadiene, ml. | 90 | 90 | 90 | 90 | 90 | 90 |
| 96 Li/4K disp., ml. | 1.54 | 1.54 | .77 | .38 | (1) | (1) |
| 99 Li/1K disp., ml. | None | None | None | None | .9 | .9 |
| G. Li/100 g. but. | .3 | .3 | .15 | 0.075 | .15 | .15 |
| Temp., °C. | 50 | 50 | 50 | 50 | 50 | 50 |
| Time, hrs. | 17 | 17 | (1) | 17 | 17 | 17 |
| Percent conversion | 100 | 100 | 62 | 91 | 100 | 100 |
| D.S.V. | 6.42 | 8.20 | 3.51 | 5.05 | 5.05 | 4.12 |
| Infrared analysis: | | | | | | |
| Percent cis-1,4 | 31.5 | 26.9 | 35.9 | 26.9 | 39.5 | 37.6 |
| Percent trans-1,4 | 41.9 | 42.0 | 44.9 | 48.8 | 48.5 | 51.8 |
| Percent 1,2 | 26.6 | 31.1 | 19.2 | 24.3 | 12 | 10.6 |

[1] Blew up.

The above indicates clearly that the 1,2 butadiene structure can be repressed at lower catalyst levels and at lower potassium levels in aliphatic solvents. The materially greater rates shown here (as compared to the preceding paragraph) are due to improved purity of the hexane and butadiene.

*Example 7*

Following the lead obtained in the preceding example, specially purified butadiene is again polymerized in purified, flash-distilled hexane utilizing a fine catalyst dispersion (made as in Example 1) containing an alloy of 99.7%/wt. lithium metal and 0.3% wt. potassium. The data are as follows:

| Experiment No. | A | B | C | D | E | F | G | H |
|---|---|---|---|---|---|---|---|---|
| Hexane, ml. | 180 | 180 | 180 | 180 | 180 | 180 | 180 | 180 |
| Butadiene, ml. | 90 | 90 | 90 | 90 | 90 | 90 | 90 | 90 |
| 99.6 Li/0.3K dispersion, ml. | .72 | .72 | .60 | .60 | .45 | .45 | .36 | .36 |
| G. Li/100 g. butadine | .12 | .12 | .10 | .10 | .075 | .075 | .06 | .06 |
| Temp. °C. | 30 | 30 | 30 | 30 | 30 | 30 | 30 | 30 |
| Percent conversion | 25.7 | 30.0 | 7.9 | 12.9 | 10.9 | 4.6 | 9.4 | 0 |
| D.S.V. | 5.33 | 4.27 | 1.16 | 5.37 | 3.59 | 1.55 | 6.96 | |
| I.R. analysis: | | | | | | | | |
| Percent Cis-1,4 | 50.5 | 44.7 | 58.3 | 54.9 | 56.4 | 65.6 | 56.5 | |
| Percent trans-1,4 | 42.7 | 47.7 | 36.2 | 39.0 | 37.8 | 29.2 | 37.9 | |
| Percent 1,2 | 6.8 | 7.6 | 5.5 | 6.1 | 5.8 | 5.2 | 5.6 | |

The above data indicate that the use of an aliphatic

| Experiment No. | A | B | C | D | E | F | G | H | I | J | K | L |
|---|---|---|---|---|---|---|---|---|---|---|---|---|
| Hexane, ml. | 180 | 180 | 180 | 180 | 180 | 180 | None | None | None | None | None | None |
| Benzene, ml. | None | None | None | None | None | None | 180 | 180 | 180 | 180 | 180 | 180 |
| Butadiene, grams | 27 | 27 | 27 | 27 | 27 | 27 | 27 | 27 | 27 | 27 | 27 | 27 |
| 96 Li/4K disp., ml. | 1.3 | 0.96 | 0.64 | 1.3 | .96 | .64 | 1.3 | .96 | .64 | 1.3 | .96 | .64 |
| G. Li/100 g. butadiene | .5 | .37 | .25 | .5 | .37 | .25 | .5 | .37 | .25 | .5 | .37 | .25 |
| Tetrahydrofurane, ml. | None | None | None | 5 | 5 | 5 | None | None | None | 5 | 5 | 5 |
| Temp., °C. | 30 | 30 | 30 | 30 | 30 | 30 | 30 | 30 | 30 | 30 | 30 | 30 |
| Time, hrs. | 90 | 90 | 138 | 66 | 66 | 240 | 240 | 240 | 240 | 240 | 240 | 240 |
| Percent Conversion | 31.5 | 74 | 98 | 100 | 100 | | 1.5 | | | .58 | .45 | |
| D.S.V. | 1.93 | 2.99 | 3.69 | 3.35 | 3.23 | | .519 | | | 1.02 | .87 | |
| I.R. analysis: | | | | | | | | | | | | |
| Percent cis-1,4 | 43.7 | 45.6 | 42.2 | 17 | 20.4 | | 25 | | | 21 | 21.5 | |
| Percent trans-1,4 | 43.7 | 42.5 | 49.1 | 26.6 | 26.8 | | 56.7 | | | 60.2 | 51.0 | |
| Percent 1,2 | 12.6 | 11.9 | 8.7 | 56.4 | 52.8 | | 18.3 | | | 18.8 | 22.5 | |

It is clear that the high cis-1,4 and high total 1,4 contents shown in Examples A–C are about normal for a reaction carried out with lithium above. Ordinarily, lithium metal catalyzed polymerization of butadiene-1,3 is more difficult. The addition of THF, however, seems to favor 1,2 structure at the expense of the cis-1,4 content. The high-1,2 polybutadienes are useful as resin-formers since they cure with heat and/or peroxide to form hard, clear resins. The level of 1,2 content and D.S.V. values of those experiments carried out without THF seem to indicate too high a catalyst level and too much potassium in the catalyst. The next series will show a direct comparison hydrocarbon, low catalyst level and low potassium level can be utilized to produce polybutadienes in which the cis-1,4 structure predominates and in which the total 1,4 structure ranges from 90 to 95% or higher. Polybutadienes such as these are exceptionally good tire rubbers since they have moderate to low hysteresis, excellent tensile strength and excellent abrasion resistance. Tires made of rubbers similar to these have given excellent service in road tests.

I claim:
1. The method comprising polymerizing at a temperature of from about 0° to about 75° C. a conjugated diene hydrocarbon containing up to 5 carbon atoms in a reaction medium containing a hydrocarbon diluent, said butadiene-1,3 hydrocarbon, a catalyst made up of particles finer than about 20 microns of an alloy of lithium and potassium metals in the weight ratio between about 666:1 and about 66:1, and an amount of methyl aniline sufficient to reduce the formation of 1,2 and 3,4 structures which normally would be induced in the polymer produced by the potassium content of said catalyst, the proportion of said catalyst utilized representing from about 0.03 part to about 0.5 part by weight, as metallic lithium, per 100 parts by weight of said butadiene-1,3 hydrocarbon, and separating the resulting polymer from said reaction medium.

2. The method as defined in claim 1 wherein the proportion of potassium in said catalyst is from 0.15 to 1.5%/wt. of the total weight of catalyst.

3. The method as defined in claim 1 wherein the said conjugated diene hydrocarbon is butadiene-1,3 and the product contains more than 90% of the 1,4 structure.

4. The method as defined in claim 1 wherein the said conjugated diene hydrocarbon is isoprene and the said resulting polymer contains more than 90% of the cis-1,4 structure.

5. The method of polymerizing monomeric isoprene to form a homopolymer having more than 90% of the isoprene units united in the cis-1,4 structure comprising mixing said monomeric isoprene with a reaction medium containing an inert aliphatic hydrocarbon solvent for said isoprene, a dispersion of catalyst particles, finer than about 10 microns, of an alloy of lithium and potassium in the Li:K weight ratio between about 666:1 and about 66:1, the proportion of said catalyst particles representing between about 0.03 part and about 0.5 part by weight, as metallic lithium, per 100 parts by weight of said monomeric isoprene, and methyl aniline in an amount which is at least a molar equivalent amount sufficient to react with the potassium content of said catalyst particles, the weight ratio of said monomeric isoprene to said solvent being between about 1:20 and about 1:4, polymerizing said monomeric isoprene in said reaction medium at a temperature between about 0 and about 75° C., and separating the resultant polymer from said reaction medium.

6. The method of producing a high 1,4 polymer of a conjugated diene hydrocarbon containing up to 5 carbon atoms, which comprises polymerizing said diene hydrocarbon in a hydrocarbon solvent at a temperature of about 0° C. to about 75° C. in the presence of a finely divided metallic catalyst made up of an alloy of lithium and potassium metals in the weight ration between about 5,000:1 and about 20:1, the proportion of said catalyst utilized representing from about 0.03 part to about 0.5 part by weight, as metallic lithium, per about 100 parts by weight of said conjugated diene hydrocarbon, and in the additional presence of methyl aniline to inhibit 1,2 polymerization induced by the potassium content of said catalyst.

References Cited in the file of this patent
UNITED STATES PATENTS
1,058,056    Harries _____ Apr. 8, 1913

OTHER REFERENCES

Barron: Modern Synthetic Rubbers, Chapman and Hall Ltd., London, 1949, pp. 193–194.